US009025499B2

(12) United States Patent
Gehring et al.

(10) Patent No.: US 9,025,499 B2
(45) Date of Patent: May 5, 2015

(54) METHOD AND SYSTEM FOR CONFIGURING MORE THAN ONE HEARING DEVICES

(75) Inventors: Stephan Gehring, Stafa (CH); Alexander Maksyagin, Benglen (CH)

(73) Assignee: Phonak AG, Stafa (CH)

( * ) Notice: Subject to any disclaimer, the term of this patent is extended or adjusted under 35 U.S.C. 154(b) by 48 days.

(21) Appl. No.: 13/636,183

(22) PCT Filed: Mar. 31, 2010

(86) PCT No.: PCT/EP2010/054388

§ 371 (c)(1),
(2), (4) Date: Sep. 20, 2012

(87) PCT Pub. No.: WO2010/076342

PCT Pub. Date: Jul. 8, 2010

(65) Prior Publication Data

US 2013/0010653 A1 Jan. 10, 2013

(51) Int. Cl.
*H04B 1/56* (2006.01)
*H04R 25/00* (2006.01)

(52) U.S. Cl.
CPC .............. *H04R 25/70* (2013.01); *H04R 25/552* (2013.01); *H04R 25/554* (2013.01); *H04R 2225/55* (2013.01)

(58) Field of Classification Search
None
See application file for complete search history.

(56) References Cited

U.S. PATENT DOCUMENTS 6,349,306 B1 2/2002 Malik et al.
7,321,662 B2 1/2008 Lundh et al.
7,940,714 B1 * 5/2011 Bettinger et al. ............. 370/316
2006/0018496 A1 1/2006 Niederdrank et al.
2006/0274747 A1 * 12/2006 Duchscher et al. ........... 370/389
2007/0171809 A1 * 7/2007 Pajukoski et al. ............. 370/208
2007/0198665 A1 * 8/2007 De Matteis et al. ........... 709/220
2008/0013764 A1 1/2008 Alber et al.

(Continued)

FOREIGN PATENT DOCUMENTS

DE 10 2007 035 171 A1 2/2009
EP 0941014 A2 9/1999

(Continued)

OTHER PUBLICATIONS

International Search Report for PCT/EP2010/054388 dated Jul. 15, 2010.
Written Opinion for PCT/EP2010/054388 dated Jul. 15, 2010.

*Primary Examiner* — Dang Ton
*Assistant Examiner* — Ronald h Davis
(74) *Attorney, Agent, or Firm* — Pearne & Gordon LLP

(57) ABSTRACT

The method for configuring at least two devices of a hearing system (10) using a communication channel comprises the steps of a1) providing, using said communication channel, a first (11) of said devices with a request (R1) for the execution (E1) of at least one first configuring command in said first device (11);

b1) executing (E1) said at least one first configuring command in said first device (11);

a2) providing, using said communication channel, a second (12) of said devices with a request (R2) for the execution of at least one second configuring command in said second device (12);

wherein step a2) is started before step b1) is completed, in particular wherein step a2) is completed before step b1) is completed. This way, time can be saved in configuring two or more devices (11;12;13) of a hearing system (10).

13 Claims, 6 Drawing Sheets

(56) References Cited

U.S. PATENT DOCUMENTS

| | | | | |
|---|---|---|---|---|
| 2008/0080394 | A1* | 4/2008 | Platz et al. | 370/254 |
| 2008/0253580 | A1 | 10/2008 | Andersen et al. | |
| 2009/0150523 | A1* | 6/2009 | Gray et al. | 709/220 |
| 2010/0086154 | A1* | 4/2010 | Frerking et al. | 381/315 |
| 2010/0202636 | A1 | 8/2010 | Frohlich et al. | |
| 2011/0013526 | A1* | 1/2011 | Mosko | 370/252 |

FOREIGN PATENT DOCUMENTS

| | | | |
|---|---|---|---|
| EP | 1410684 | A | 4/2004 |
| EP | 1596633 | A2 | 11/2005 |
| WO | 03/003792 | A1 | 1/2003 |
| WO | 2006/074655 | A1 | 7/2006 |

* cited by examiner

METHOD AND SYSTEM FOR CONFIGURING MORE THAN ONE HEARING DEVICES

TECHNICAL FIELD

The invention relates to the field of hearing devices, and in particular to methods and systems for configuring hearing devices. It relates to methods and apparatuses according to the opening clauses of the claims.

Under a hearing device, a device is understood, which is worn in or adjacent to an individual's ear with the object to improve the individual's audiological perception. Such improvement may also be barring acoustic signals from being perceived in the sense of hearing protection for the individual. If the hearing device is tailored so as to improve the perception of a hearing impaired individual towards hearing perception of a normal-hearing individual, then we speak of a hearing-aid device. With respect to the application area, a hearing device may be applied, e.g., behind the ear, in the ear, completely in the ear canal or may be implanted.

A hearing system comprises at least one hearing device. In case that a hearing system comprises at least one additional device, all devices of the hearing system are operationally connectable within the hearing system. Typically, said additional devices such as another hearing device, a remote control or a remote microphone, are meant to be worn or carried by said individual.

In various documents, e.g., in U.S. Pat. No. 7,321,662, US 2008/253580 A1, EP 1410684 B1 and DE 102007035171 A1, the configuration of a hearing device is discussed. More precisely, the configuration of one single hearing device is discussed. The configuration of more than one hearing devices is not addressed in these documents.

EP 1596633 A2 discloses a system with two hearing instruments and a system for programming one or more hearing aids with a host computer.

It is furthermore known to sequentially configure two hearing devices, i.e. to firstly configure a first hearing device and then, when the configuration of the first hearing device is finished, to configure a second hearing device.

SUMMARY OF THE INVENTION

It is one object of the invention to create an alternative, in particular an improved method for configuring two or more devices of a hearing system. In addition, the respective hearing device configuration system shall be provided.

Another object of the invention is to provide a particularly fast and time-saving way, respectively, to configure two or more devices of a hearing system.

Further objects emerge from the description and embodiments below.

At least one of these objects is at least partially achieved by apparatuses and methods according to the patent claims.

The method for configuring $N \geq 2$ devices of a hearing system using a communication channel comprises the steps of

- a1) providing, using said communication channel, a first of said N devices with a request for the execution of at least one first configuring command in said first device;
- b1) executing said at least one first configuring command in said first device;
- a2) providing, using said communication channel, a second of said N devices with a request for the execution in said second device of at least one second configuring command;

wherein step a2) is started before step b1) is completed, in particular wherein step a2) is completed before step b1) is completed.

This way, much time can be saved in the configuration of two or more devices of a hearing system.

The inventors have found that in the configuration of hearing devices, the major portion of the time required is spent on the execution of configuring commands in the respective devices. They found that with respect to the known ways of configuring more than one hearing devices, in which the devices are configured one after the other, much time can be saved by trying to have configuring commands executed in the respective devices as much as possible at the same time, i.e. in a simultaneous or overlapping manner. And, in addition, the inventors found that despite the advanced communication techniques used for configuring today's hearing devices, considerable time is spent on their configuration. So much time is spent thereon that, e.g., a hearing device fitter having to configure several devices might be bothered having to wait so long until the configurations are done, and a hearing-aid device user might be bothered having to wait so long until he can receive his hearing-aid device after improved settings have been obtained in a fitting session, the hearing device user having to wait quite some time until the settings are transferred into his hearing-aid devices, whereas the hearing device user would of course prefer to be able to receive the devices of his hearing system practically immediately after the settings have been determined.

In one embodiment, said first and second devices are different from one another. This is the usual envisaged case.

In one embodiment which may be combined with the before-addressed embodiment, said providing in steps a1) and a2) is carried out by sending the respective request via said one communication channel.

One and the same communication channel is used for carrying out the method steps a1) and a2). This does not exclude that further steps are possibly accomplished using another communication channel, e.g., for configuring additional devices.

A communication channel is in many cases bound to one carrier frequency and is operable in a simplex, duplex (also referred to as full duplex) or half-duplex operation, as is well known. Roughly spoken, in simplex operation, only one network member can send messages; in half duplex operation, more than one network members can send messages, but not more than one message can be sent at one time; and in duplex operation, more than one network members can send messages, and two messages can be sent at the same time in opposite directions.

Said configuring commands can be or comprise, e.g., commands executable in the respective device, one or more links to commands executable in the respective device (the actual commands can be stored inside or outside the device), or said configuring commands can be or comprise code encoding the commands, to be decoded for obtaining the actual executable commands.

There are two main aspects of said configuring, which can occur separately or in a mixed fashion in the method. One is the installation or reinstallation of new or updated firmware in the device; the other is configuring the device individually, in particular for an individual, i.e. for a user to be using the device, more particularly configuring the device in dependence of the user's hearing loss. The latter is usually done during or at the end of a fitting session, for installing new or edited program settings, settings for gain curves and the like in the device, in particular said device being a hearing device. The first can be done, e.g., during the manufacture of the device, in particular said device being a hearing device. It shall be noted, however that also during manufacture of the device, a device may be configured individually, e.g., when calibration data are stored in the device.

In one embodiment which may be combined with one or more of the before-addressed embodiments, the method is a method for individually configuring N≥2 devices, in particular for individually configuring N≥2 hearing devices.

Said "individually configuring" means that said devices are to be configured not in an identical way, i.e. one or more configuring commands are to be executed in said first, but not in said second device or vice versa. This does not exclude that, in addition, one or more configuring commands are sent to said first and to said second device, for execution in both, said first and said second device.

In one embodiment which may be combined with one or more of the before-addressed embodiments, said communication channel is a physical communication channel.

In one embodiment which may be combined with one or more of the before-addressed embodiments, said communication channel is a shared resource, in particular a shared resource shared at least between said first device and said second device.

In one embodiment which may be combined with one or more of the before-addressed embodiments, said communication channel is a communication channel of a network.

In one embodiment which may be combined with one or more of the before-addressed embodiments, said communication channel is a communication channel of a wireless network, and, accordingly, said providing mentioned in steps a1) and a2) is carried out in a wireless fashion. Alternatively, said communication channel is a communication channel of a wire-bound network, and, accordingly, said providing mentioned in steps a1) and a2) is carried out in a wirebound fashion.

In one embodiment which may be combined with one or more of the before-addressed embodiments, the method comprises the step of b2) executing said at least one second configuring command in said second device.

In one embodiment which may be combined with one or more of the before-addressed embodiments, said at least one first configuring command is not identical with said at least one second configuring command. Such different first and second configuring commands come up in case of individually configured devices. It is also possible that said first and second configuring commands are identical; in this case, a broadcast and/or a multicast addressing scheme can be used.

In one embodiment which may be combined with one or more of the before-addressed embodiments, at least one of said first and second devices is a hearing device. In particular, both devices are hearing devices.

In one embodiment which may be combined with one or more of the before-addressed embodiments, at least one of said first and second devices is a hearing-aid device. In particular, both devices are hearing-aid devices.

In one embodiment which may be combined with one or more of the before-addressed embodiments, said communication channel is operated in duplex or half duplex operation, and said method comprises, after step a1) has been completed, the step of c1) transmitting, from said first device and using said communication channel, a first response message.

In one embodiment which may be combined with one or more of the before-addressed embodiments except with the last-addressed embodiment, said communication channel is operated in half duplex operation, and said request mentioned in step a1) is sent as a unicast message, and said request mentioned in step a2) is sent as a unicast message, and wherein said method comprises, upon detecting in said first device that step b1) is finished, the step of c1') transmitting, from said first device and using said communication channel, a first response message indicative of a termination of step b1).

In particular, said method comprises, upon detecting in said first device that step b1) is finished successfully, the step of c1") transmitting, from said first device and using said communication channel, a first response message indicative of a successful termination of step b1).

In one embodiment which may be combined with one or more of the before-addressed embodiments comprising step c1), said first response message is indicative of at least one of the group consisting of a reception in said first device of said request mentioned in step a1), in particular a successful reception thereof;

a termination of said step b1), in particular a successful (or an unsuccessful) termination thereof;

a time at which said step b1) is expected to be finished.

Said successful reception can be determined, e.g., using a checksum, as is known in the art.

Said successful termination can be determined, e.g., using a flag, as is known in the art.

Said time can be indicated, e.g., by an absolute time, by a network time or by a time interval (in whichever time units) indicating how long it will presumeably take until step b1) will be finished.

In one embodiment which may be combined with one or more of the before-addressed embodiments comprising step c1), step c1) is carried out automatically, and in particular independent of receiving in said first device a polling message. E.g., step c1) is carried out upon detecting in said first device that said request mentioned in step a1) has been received in said first device; or upon detecting in said first device that said request mentioned in step a1) has been successfully received in said first device; or upon detecting in said first device that said step b1) is finished; or upon detecting in said first device that said step b1) is finished successfully; or upon determining a time at which said step b1) is expected to be finished.

In one embodiment which may be combined with one or more of the before-addressed embodiments comprising step c1) except for the last-addressed embodiment, step c1) is carried out upon reception in said first device of a polling message.

In one embodiment which may be combined with one or more of the before-addressed embodiments, said request mentioned in step a1) is sent as a unicast message.

In one embodiment which may be combined with one or more of the before-addressed embodiments except with the last-addressed embodiment, said request mentioned in step a1) is sent as a multicast message.

In one embodiment which may be combined with one or more of the before-addressed embodiments except with the last-addressed two embodiments, said request mentioned in step a1) is sent as a broadcast message In one embodiment which may be combined with one or more of the before-addressed embodiments, said request mentioned in step a2) is sent as a unicast message or as a multicast message.

In one embodiment which may be combined with one or more of the before-addressed embodiments except with the last-addressed embodiment, said request mentioned in step a2) is sent as a broadcast message.

In one embodiment which may be combined with one or more of the before-addressed embodiments except where the communication channel is operated in duplex or in half-duplex mode, said communication channel is operated in simplex mode. In this case, the method can be carried out, e.g., using one or more timers by means of which the time of the presumed terminations of command executions is estimated. This mode of carrying out the method is generally not safe, since no feedback from the devices can be evaluated. In order to provide a safe configuring process, a duplex or a half-duplex operation of the communication channel is used rather than a simplex operation.

The hearing system configuration system for configuring N≥2 devices of a hearing system comprises a first and a second device of said hearing system and a configuration unit comprising a communication unit, wherein said configuration unit is structured and configured for operating a network with said first and second devices and said communication unit as network members. Said network comprises a communication channel, and said configuration unit is structured and configured for a1') providing, using said communication channel, said first device with a request for the execution in said first device of at least one first configuring command; and for a2') providing, using said communication channel, said second device with a request for the execution in said second device of at least one second configuring command; and wherein said configuration unit is structured and configured for starting step a2'), in particular for completing step a2'), before an execution said at least one first configuring command in said first device is completed.

In one embodiment of the hearing system configuration system, it comprises a computer with a hearing device fitting software. In particular, wherein said computer with said hearing device fitting software is comprised in said configuration unit.

In one embodiment of the hearing system configuration system, it comprises a computer with a manufacturing configuration software. In particular, wherein said computer with said hearing device manufacturing configuration software is comprised in said configuration unit. A manufacturing configuration software is used during the manufacture of devices of a hearing system, in particular of hearing devices.

The invention comprises hearing system configuration systems with features of corresponding methods according to the invention, and vice versa.

The advantages of the hearing system configuration systems basically correspond to the advantages of corresponding methods and vice versa.

The computer program product comprises program code for causing a computer to perform the steps of D) operating a network comprising a network channel, with a first and a second device of a hearing system and a communication unit as network members;

A1') instructing said communication unit to provide, using said communication channel, said first device with a request for the execution of at least one first configuring command in said first device;

A2') instructing said communication unit to provide, using said communication channel, said second device with a request for the execution in said second device of at least one second configuring command; and wherein said program code is configured to cause that said computer carries out steps A1') and A2') in such a way that said providing said second device with said request mentioned in step A2') is started, in particular is completed, before an execution in said first device of said at least one first configuring command is completed.

The invention comprises computer program products with features of corresponding methods according to the invention, and vice versa, and it comprises computer program products with features of corresponding hearing system configuration systems according to the invention, and vice versa.

The advantages of the computer program products basically correspond to the advantages of corresponding methods and hearing system configuration systems, respectively, and vice versa.

The computer-readable medium comprises program code as described above.

Further embodiments and advantages emerge from the dependent claims and the figures.

BRIEF DESCRIPTION OF THE DRAWINGS

Below, the invention is described in more detail by means of examples and the included drawings. The figures show schematically.

The reference symbols used in the figures and their meaning are summarized in the list of reference symbols. Generally, alike or alike-functioning parts are given the same or similar reference symbols. The described embodiments are meant as examples and shall not confine the invention.

DETAILED DESCRIPTION OF THE INVENTION

Figure 1:
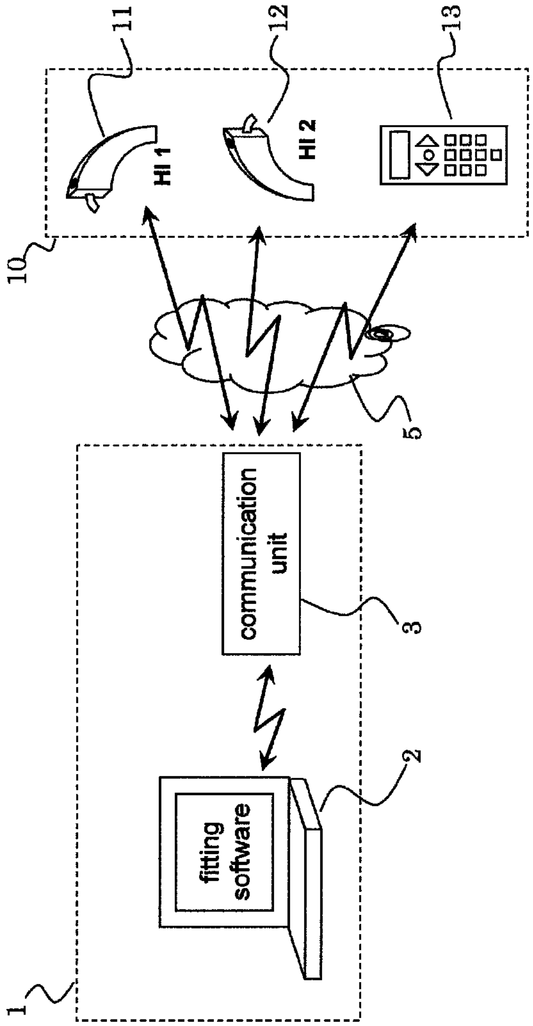
FIG. 1 a diagram of a hearing system configuration system.

FIG. 1 shows a schematic diagram of a hearing system configuration system. The hearing system configuration system comprises a configuring unit 1 and a hearing system 10 which are operationally interconnected via a network 5 which may be a wireless or a wirebound network. Configuring unit 1 comprises a computer 2 with a fitting software running thereon and, operationally connected thereto, a communication unit 3 (which may be embodied integrated in the computer 2). The operational connection between communication unit 3 and computer 2 may be embodied in a wireless or in a wirebound fashion. Hearing system 10 comprises three devices: two hearing devices 11, 12 and a remote control 13.

When a new firmware shall be installed in one or more devices of the hearing system 10, or at the end of a fitting session during which new transfer functions for the hearing devices 11,12 have been determined or other measures have been taken to individually adjust one or more of the devices 11,12,13 of the hearing system 10 to a user of the hearing system, new data have to be transmitted from the configuration system 1 to one or more of the devices 11,12,13. This configuring of the devices is accomplished via network 5.

In order to configure the devices 11 and/or 12 and/or 13, a communication channel of network 5 is used for requesting the respective device to execute (in the respective device) one or more configuring commands, e.g., by transmitting the configuring commands itself to the respective device. For each device, this is usually done blockwise, i.e. by successively transmitting several requests (for the execution of usually different configuring commands) to the respective device.

After all the configuring commands for one device have been (successfully) executed, the configuration of the respective device is at least substantially finished.

In the following, we will concentrate on the communication between configuration unit 1 and the devices 11,12,13 of the hearing system 10. For reasons of simplicity, we will refer to two devices only, e.g., to two hearing devices such as devices 11 and 12 in FIG. 1.

The FIGS. 2 to 10 are schematic time diagrams ("t" denotes time). "CS" denotes configuration unit 1, "HI" denotes a device such as hearing device 11 or 12, "HI 1" denotes hearing device 11, and "HI 2" denotes hearing device 12.

"REQ" denotes a request message, also shortly referred to as a "request", "EXEC" denotes the execution in a device, more precisely the execution of one or more configuring commands in a device of the hearing system 10, and "RSP" denotes a response message, also shortly referred to as a "response", sent by a device of the hearing system 10.

From the state of the art, it is known to configure two or more devices in a purely sequential manner, i.e. firstly, a first device is configured (by requesting the execution of configuring commands and a subsequent execution of the commands in the respective device), and then the next device is configured (in an analoguous manner).

Figure 2:
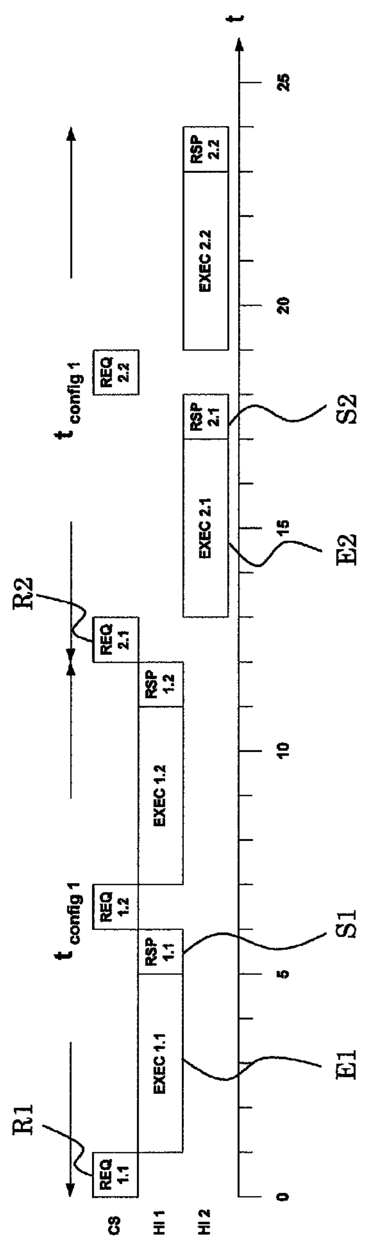
FIG. 2 a diagram illustrating a purely sequential configuration of two devices.

FIG. 2 shows a schematic diagram illustrating a purely sequential configuration of two devices. Firstly, a first request R1 is transmitted to the first device. Thereupon, the respective commands are executed (cf. E1) in the first device. When execution E1 is finished, a response message S1 (in short: response S1) is sent from the first device to configuration unit 1. Having received that response S1, configuration unit 1 can continue by transmitting another request to the first device, and a corresponding execution of command in the first device followed by a corresponding response. And further requests, executions and responses may follow (not shown in FIG. 2).

When the configuration of the first device is finished, the second device will be configured in an analoguous manner, starting with a request R2, a subsequent execution E2 in the second device and thereafter a response S2 and so on, until also the second device is configured.

As will be appreciated, the process illustrated in FIG. 2 makes use of one communication channel which is operated in a half-duplex operation, and unicast addressing (unicast messaging) and a request-response protocol is used.

Such a purely sequential way of configuring several devices one after the other, as illustrated in FIG. 2, is rather simple to implement and provides a relatively safe and straight-forward way to fulfill the task. But it is not particularly desirable, because it consumes a considerable amount of time. The total configuration time is the sum of the individual execution times and the time spent sending requests and responses (cf. FIG. 2, $t_{config\ 1}$ and $t_{config\ 2}$).

Note that due to the smallness of hearing devices, the available resources therein, in particular the processing (and therefore the command execution) resources are very limited. As indicated in the Figures, the time needed for execution steps will usually be considerably longer than the time required for the communication (requests; responses).

We are and will be looking at what can be accomplished by means of one single communication channel, wherein said communication channel is a shared resource shared between all network members. In the case that two channels are available, one can, of course, simultaneously configure two devices, which requires only approximately half the time compared to a sequential configuring.

In FIGS. 3 to 10, the same type of illustration is shown as in FIG. 2. Therefore, the description will be shorter, since many important points are clear already from the Figures alone.

Figure 3:
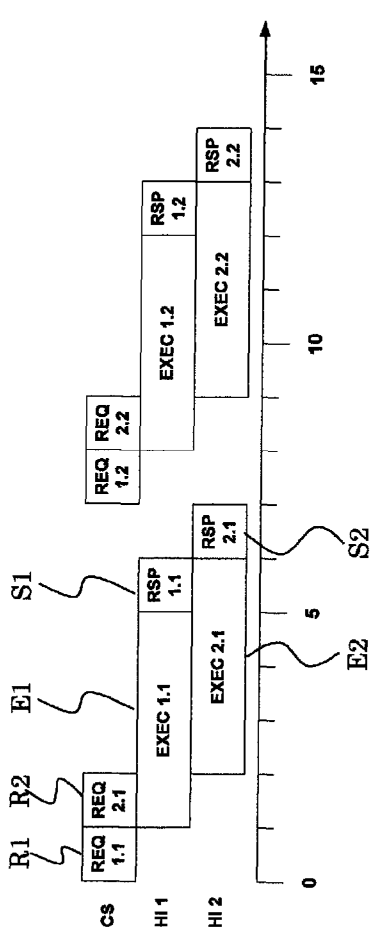
FIG. 3 a diagram illustrating a configuration of two devices via a half-duplex communication channel using a request-response protocol and unicast addressing.

FIG. 3 shows a schematic diagram illustrating a configuration of two devices via a half-duplex communication channel using a request-response protocol and unicast addressing. Request R1 provokes the execution E1 in hearing device 11, and request R2, sent immediately after request R1 provokes the execution E2 in hearing device 12. Thus, during a considerable span of time, executions E1 and E2 run simultaneously. This way, a considerable amount of time is saved in the configuration of the two devices if compared to the solution of FIG. 2. Subsequent requests (cf. "REQ 1.2" and "REQ 2.2") are handled analoguously.

If the communication channel were operated in full duplex operation, "REQ 1.2" could even be transmitted immediately after response S1 ("RSP 1.1"; which would be simultaneous to response S2), such that the whole second part illustrated in FIG. 3 could take place earlier, thus leading to even further time savings.

Figure 4:
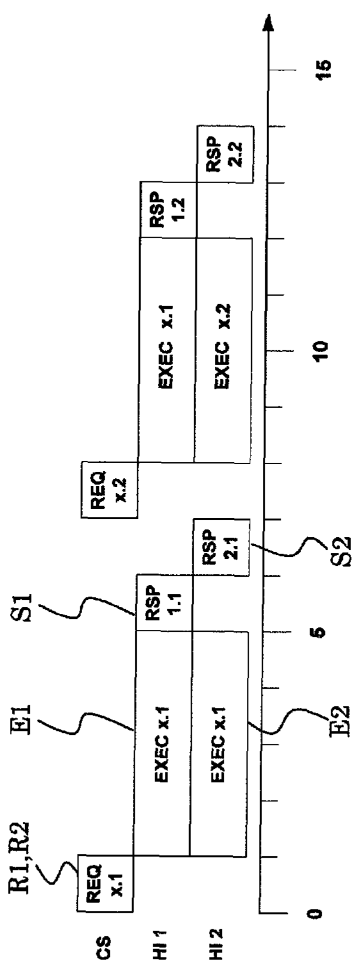
FIG. 4 a diagram illustrating a configuration of two devices via a half-duplex communication channel using a request-response protocol and multicast addressing which allows to simultaneously configure multiple devices.

FIG. 4 shows a schematic diagram illustrating a configuration of two devices via a half-duplex communication channel using a request-response protocol and multicast addressing which allows to simultaneously configure multiple devices. The request indicated as "REQ x.1" is for both devices 11,12 and is therefore labelled R1,R2. Upon the reception of request R1,R2, both devices 11,12 will (at least substantially) simultaneously execute (cf. E1,E2) the requested configuring commands. Upon termination of the execution, the devices will send responses S1 and S2, respectively. In the depicted case of half-duplex operation, responses S1 and S2 will have to be sent one after the other; the order of S1 and S2 can be determined in any known way.

Upon reception of all responses, configuring unit 1 can send another request (REQ x.2) which can be handled analoguously to R1,R2.

While FIG. 4 has been described as a multicast addressing implementation, one can also interpret it as a broadcast addressing implementation. This would mean that the request applies to all devices being a member of the network 5.

Figure 5:
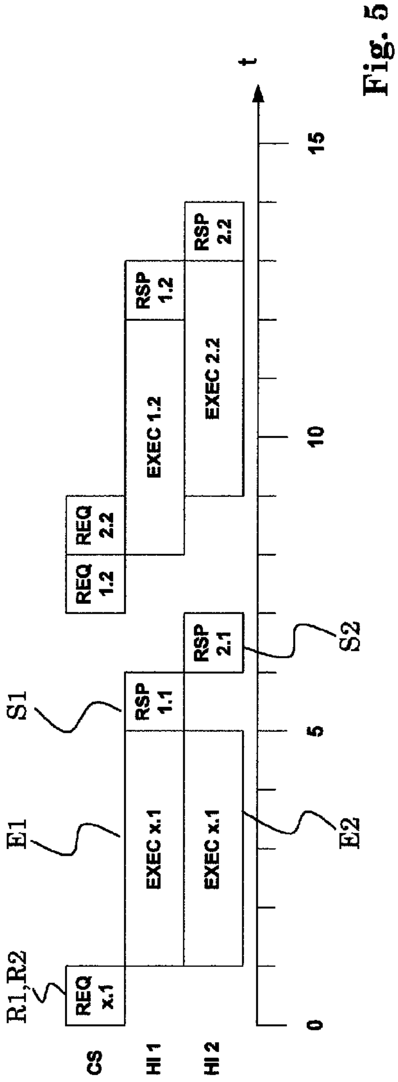
FIG. 5 a diagram illustrating a configuration of two devices via a half-duplex communication channel using a request-response protocol and combined unicast and multicast addressing.

FIG. 5 shows a schematic diagram illustrating a configuration of two devices via a half-duplex communication channel using a request-response protocol and combined unicast and multicast addressing. This embodiment exemplifies that during the configuration of two or more devices, it is possible to mix addressing schemes for messages (requests) subsequently sent to the same device. The first part corresponds to the first part of the embodiment of FIG. 4 (multicast—or broadcast—messaging), and the second part corresponds to the second part of the embodiment of FIG. 3 (unicast messaging). E.g., in the first part, configuring commands are concerned which are identical to all devices, such as commands for updating the device firmware of like devices, and in the second part, configuring commands are concerned which are not identical to the devices, such as commands reflecting a different hearing ability of the hearing system user with his left and his right ear.

Figure 6:
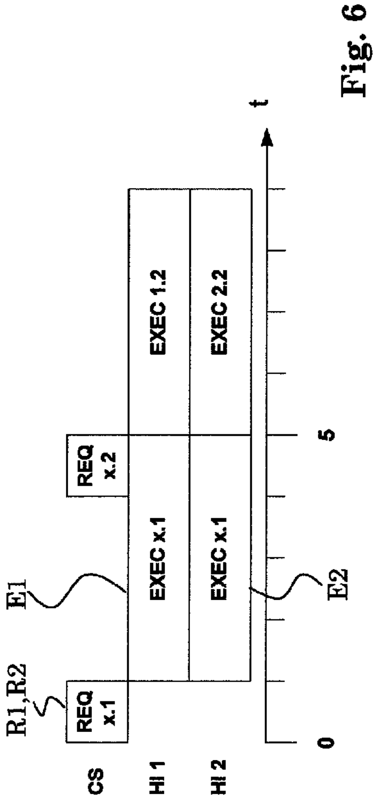
FIG. 6 a diagram illustrating a configuration of two devices via a simplex communication channel using multicast addressing, in which the devices are capable of simultaneously receiving messages and executing configuring commands.

FIG. 6 shows a schematic diagram illustrating a configuration of two devices via a simplex communication channel using multicast addressing, in which the devices are capable of simultaneously receiving messages and executing configuring commands. And furthermore, the embodiment of FIG. 6 can be interpreted as implementing broadcast addressing (like in the case of FIG. 4 and in the first portion of FIG. 5). Due to the fact that the devices are capable of simultaneously receiving messages (such as "REQ x.2") and executing configuring commands (such as E1 and E2, respectively), the configuration of the devices needs even less time. The fact that no responses are provided, which is per se impossible in simplex operation, makes the process less safe. Of course, also half-duplex (or even full-duplex) operation could be provided in this embodiment, but these features are not made use of during the time span depicted in FIG. 6.

A request-response protocol provides an increased safety of the process.

Whereas in the Figures above responses (S1,S2) have been initiated by the termination of an execution (E1,E2), it is—as an alternative which can be combined with the respective embodiments discussed above—also possible to poll for responses.

Figure 7:
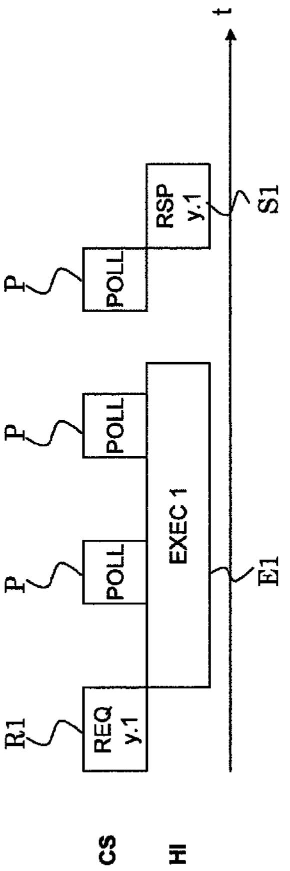
FIG. 7 a diagram illustrating a process via a half-duplex communication channel using polling.

FIG. 7 shows a schematic diagram illustrating a process via a half-duplex communication channel using polling. After sending request R1, configuring unit 1 sends polling messages P, and the device concerned sends a response S1 as soon as it receives a poll message after the execution E1 of the configuring commands is finished.

It is—as another alternative which can be combined with the respective embodiments discussed above—also possible to use a timer in order to determine when another request to the same device may be sent (cf. also the embodiment of FIG. 6 above). This would require knowledge (at least at the configuration unit) of the respective execution times.

Figure 8:
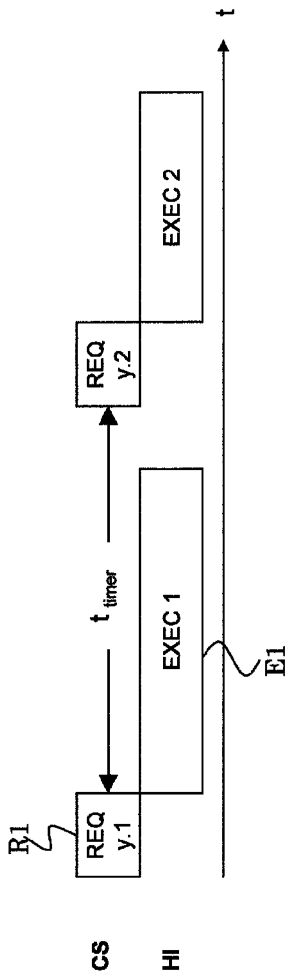
FIG. 8 a diagram illustrating a process via a simplex communication channel using a timer.

FIG. 8 shows a schematic diagram illustrating a process via a simplex (or half-duplex or duplex) communication channel using a timer.

Figure 9:
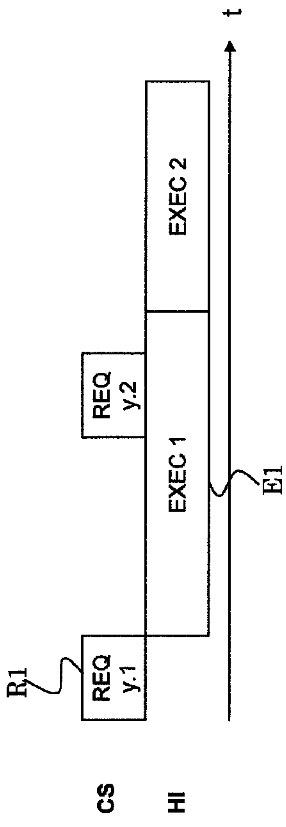
FIG. 9 a diagram illustrating a process via a simplex communication channel, in which the device is capable of simultaneously receiving messages and executing configuring commands.

FIG. 9 shows a schematic diagram illustrating a process via a simplex (or half-duplex or duplex) communication channel, in which the device is capable of storing configuring commands and simultaneously receiving messages and executing configuring commands. The transmission of the second request ("REQ y.2") can be initiated, e.g., by a timer, or by a response of the device sent before the execution E1 is finished (the latter not shown in FIG. 9). This is also a very efficient way of saving time in the process.

Figure 10:
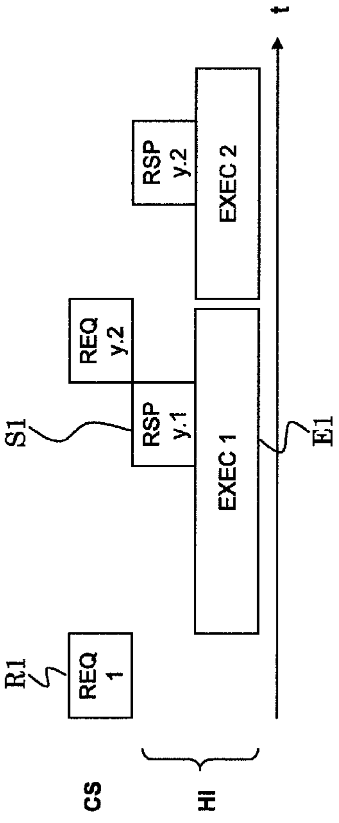
FIG. 10 a diagram illustrating a process via a half-duplex communication channel using a request-response protocol, in which the device is capable of simultaneously transmitting messages and executing configuring commands, and wherein responses are sent prior to the termination of an execution.

FIG. 10 shows a schematic diagram illustrating a process via a half-duplex communication channel using a request-response protocol, in which the device is capable of simultaneously transmitting messages and executing configuring commands, and wherein responses are sent prior to the termination of an execution. The device transmits response S1 before execution E1 is finished either at a predetermined time span before a projected termination of the execution E1, or the response S1 itself contains time information indicative of a projected time at which the execution E1 is finished.

Aspects of the embodiments have been described in terms of functional units. As is readily understood, these functional units may be realized in virtually any number of hardware and/or software components adapted to performing the specified functions. For example, configuration unit 1 could be merely a wireless communication interface with a storage unit such as flash memory, RAM or a harddisk, which is configured to receive the requests to be sent and information about the communication and protocols. The requests (or data descriptive thereof) would be copied from elsewhere into the storage unit, and then, the configuration unit 1 could, very much on its own, operationally connected to the hearing system 10, carry out one of the above-described processes or a combined process.

As will be appreciated, the fact that a second device is requested to carry out configuration commands already before the execution of configuration commands in the first hearing device is finished, can lead to considerable time savings in the process of configuring two (or more) devices of a hearing system. Typically, the request to the second device is sent while the execution in the first device is still being carried out.

LIST OF REFERENCE SYMBOLS

1 configuration unit
2 computer, computer with fitting software
3 communication unit
5 network
10 hearing system
11 device, hearing device
12 device, hearing device
13 device, remote control
E1 execution, execution of at least one (first) configuring command
E2 execution, execution of at least one (second) configuring command
P message, polling message
R1 message, request, request for the execution of at least one (first) configuring command
R2 message, request, request for the execution of at least one (second) configuring command
S1 message, response, response message
S2 message, response, response message
$t_{timer}$ time, timer time
$t_{config\ 1}$ time, time for configuration of first device
$t_{config\ 2}$ time, time for configuration of second device

The invention claimed is:

1. A method for individually configuring with a configuration unit (1) a first device and a second device (11; 12; 13) of a hearing system (10) using a communication channel operationally interconnecting said configuration unit (1) with said hearing system (10), said method comprising:

a1) said configuration unit (1) sending, using said communication channel, said first device (11) a request (R1) for execution of at least one first configuring command in said first device (11);

b1) executing (E1) said at least one first configuring command in said first device (11);

a2) said configuration unit (1) sending, using said communication channel, said second device (12) a request (R2) for execution in said second device (12) of at least one second configuring command;

b2) executing (E2) said at least one second configuring command in said second device (12);

wherein a2) is started after a1) is completed and before b1) is completed, a2) is completed before b1) is completed, b1) and b2) run simultaneously during a majority of the execution time for the first and second configuring commands, said at least one first configuring command is not identical with said at least one second configuring command, and an installation or reinstallation of new or updated firmware, or of new hearing device settings obtained in a fitting session for said first device (11) and said second device (12), respectively, is performed based on executing (E1, E2) said at least one first configuring command in said first device (11) and said at least one second configuring command in said second device (12).

2. The method according to claim 1, wherein at least one of said first (11) and second devices (12) is a hearing device.

3. The method according to claim 1, wherein at least one of said first (11) and second (12) devices is a hearing-aid device.

4. The method according to claim 1, wherein said communication channel is operated in duplex or half duplex operation, said method comprising, after a1) has been completed, c1) transmitting, from said first device (11) and using said communication channel, a first response message (S1).

5. The method according to claim 1, wherein said communication channel is operated in half duplex operation, and said request (R1) in a1) is sent as a unicast message, and said request (R2) in a2) is sent as a unicast message, and wherein said method comprises, upon detecting in said first device (11) that b1) is finished, c1') transmitting, from said first device (11) and using said communication channel, a first response message (S1) indicative of a termination of b1).

6. The method according to claim 4, wherein said first response message (S1) is indicative of at least one of the group consisting of a reception in said first device (11) of said request (R1) mentioned in a1), a termination of said b1);

a time at which b1) is expected to be finished.

7. The method according to claim 4, wherein c1) is carried out automatically and independent of receiving in said first device (1) a polling message (P).

8. The method according to claim 4, wherein c1) is carried out upon reception in said first device (11) of a polling message (P).

9. The method according to claim 1, wherein said request (R1) in a1) is sent as a unicast message or as a multicast message.

10. A hearing system configuration system for individually configuring devices of a hearing system (10), comprising a first (11) and a second (12) device of said hearing system (10) and a configuration unit (1) comprising a communication unit (3), wherein said configuration unit (1) is structured and configured for operating a network (5) with said first (11) and second (12) devices and said communication unit (3) as network members, said network (5) comprising a communication channel, and wherein said configuration unit (1) is structured and configured for a1') sending, using said communication channel, to said first device (11) a request (R1) for the execution in said first device (11) of at least one first configuring command; and for a2') sending, using said communication channel, to said second device (12) a request for the execution in said second device (12) of at least one second configuring command; and wherein said configuration unit (1) is structured and configured for starting a2') after a1') is completed, and for completing a2') before an execution (E1) of said at least one first configuring command in said first device (11) is completed, and wherein said at least one first configuring command is not identical with said at least one second configuring command, and an installation or reinstallation of new or updated firmware, or of new hearing device settings obtained in a fitting session for said first device (11) and said second device (12), respectively, is performed based on executing (E1, E2) said at least one first configuring command in said first device (11) and said at least one second configuring command in said second device (12).

11. The hearing system configuration system according to claim 10, comprising a computer (2) with a hearing device fitting software.

12. A computer program product comprising program code for causing a computer (2) of a configuration unit (11) to perform:

D) operating a network (5) comprising a network channel, with a first (11) and a second (12) device of a hearing system (10) and a communication unit (3) as network members;

A1') instructing said communication unit (3) to send, using said communication channel, to said first device (11) a request (R1) for an execution in said first device (11) of at least one first configuring command;

A2') instructing said communication unit (3) to send, using said communication channel, to said second device (12) a request (R2) for an execution in said second device (12) of at least one second configuring command; and wherein said program code is configured to cause said computer (2) to carry out A1') and A2') in such a way that said sending to said second device (12) said request (R2) in A2') is started after A1' is completed, and is completed before an execution (E1) in said first device (11) of said at least one first configuring command is completed, and wherein said at least one first configuring command is not identical with said at least one second configuring command, and an installation or reinstallation of new or updated firmware, or of new hearing device settings obtained in a fitting session for said first device (11) and said second device (12), respectively, is performed based on executing (E1, E2) said at least one first configuring command in said first device (11) and said at least one second configuring command in said second device (12).

13. The computer program product according to claim 12, wherein a computer-readable medium comprises the program code of claim 12.

* * * * *